US012312001B2

(12) United States Patent
Kato et al.

(10) Patent No.: US 12,312,001 B2
(45) Date of Patent: May 27, 2025

(54) TILT STRUCTURE FOR CONSOLE AND CONSOLE

(71) Applicants: STARTING INDUSTRIAL CO., LTD., Tokyo (JP); KOMATSU LTD., Tokyo (JP)

(72) Inventors: Hiroki Kato, Tokyo (JP); Ami Ishimizu, Tokyo (JP); Norihiro Iwahashi, Tokyo (JP); Takuma Shoda, Tokyo (JP); Keita Tanaka, Tokyo (JP)

(73) Assignees: STARTING INDUSTRIAL CO., LTD., Tokyo (JP); KOMATSU LTD., Tokyo (JP)

( * ) Notice: Subject to any disclaimer, the term of this patent is extended or adjusted under 35 U.S.C. 154(b) by 535 days.

(21) Appl. No.: 17/774,401

(22) PCT Filed: Dec. 2, 2020

(86) PCT No.: PCT/JP2020/044871
§ 371 (c)(1),
(2) Date: May 4, 2022

(87) PCT Pub. No.: WO2021/131556
PCT Pub. Date: Jul. 1, 2021

(65) Prior Publication Data
US 2022/0371649 A1 Nov. 24, 2022

(30) Foreign Application Priority Data
Dec. 26, 2019 (JP) .................................. 2019-236072

(51) Int. Cl.
*B62D 1/189* (2006.01)
*B62D 1/183* (2006.01)
(Continued)

(52) U.S. Cl.
CPC .............. *B62D 1/189* (2013.01); *B62D 1/183* (2013.01); *B62D 1/184* (2013.01); *E02F 9/16* (2013.01)

(58) Field of Classification Search
CPC ........ B62D 1/189; B62D 1/183; B62D 1/184; E02F 9/16
See application file for complete search history.

(56) References Cited

U.S. PATENT DOCUMENTS

| 791,275 A * | 5/1905 | Lofton | ................... B62D 1/184 74/424.6 |
| 11,180,900 B2 * | 11/2021 | Watanabe | ................ G05G 1/40 |

(Continued)

FOREIGN PATENT DOCUMENTS

| JP | S61-62970 U | 4/1986 |
| JP | H0217167 B2 * | 4/1990 |

(Continued)

OTHER PUBLICATIONS

Feb. 22, 2021 International Search Report issued in International Patent Application No. PCT/JP2020/044871.

(Continued)

Primary Examiner — Faye M Fleming
(74) Attorney, Agent, or Firm — Oliff PLC

(57) ABSTRACT

A tilt structure allows the tilt of a console to be changed through simple motion and has a simple configuration. The tilt structure includes: a second frame attached to an upper portion of a first frame and is swingable upward and downward; and a control member attached to the second frame and is tiltable backward and forward through a tilting shaft. The control member includes a guide part with a groove housing a first frame pin. A locked and unlocked state switch to each other by causing the control member to tilt. The locked state includes a pin engaged with any of the engagement parts. The unlocked state includes the pin (Continued)

disengaged. The tilt of the second frame relative to the first frame is changed by engaging the pin with an arbitrary engagement part of any of the engagement parts and changing a distance between the tilting shaft and pin.

12 Claims, 14 Drawing Sheets

(51) Int. Cl.
 *B62D 1/184* (2006.01)
 *E02F 9/16* (2006.01)

(56) References Cited

U.S. PATENT DOCUMENTS

| | | | | |
|---|---|---|---|---|
| 11,642,989 | B2* | 5/2023 | Kato | E02F 9/166 297/325 |
| 2009/0321171 | A1* | 12/2009 | Hakansson | B62D 1/183 296/190.08 |
| 2022/0364325 | A1* | 11/2022 | Kato | E02F 9/2004 |

FOREIGN PATENT DOCUMENTS

| | | | | |
|---|---|---|---|---|
| JP | H03-027100 | Y2 | 6/1991 | |
| JP | H07-019058 | U | 4/1995 | |
| JP | 09291564 | A * | 11/1997 | E02F 9/2004 |
| JP | H09-291564 | A | 11/1997 | |
| JP | 3034795 | B2 * | 4/2000 | E02F 9/2004 |
| JP | 2008-63891 | A | 3/2008 | |
| JP | 4535457 | B2 | 9/2010 | |
| JP | 4555268 | B2 | 9/2010 | |
| KR | 0130039 | Y1 * | 12/1998 | B62D 1/183 |

OTHER PUBLICATIONS

Feb. 22, 2021 Written Opinion of the International Searching Authority issued in International Patent Application No. PCT/JP2020/044871.

Feb. 27, 2024 Office Action issued in Chinese Patent Application No. 202080090323.8.

* cited by examiner

TILT STRUCTURE FOR CONSOLE AND CONSOLE

TECHNICAL FIELD

This invention relates to a console arranged at a lateral part of a seat, and a tilt structure to change the tilt of the console.

BACKGROUND ART

A construction machine such as a hydraulic shovel has a driver seat provided in a cabin, and a platform for getting on and off the driver seat is provided on either a right side or a left side. A console is arranged at a lateral part of the seat and the console includes an operation lever for steering provided in a protruding position. In some cases, a tilt structure to change the tilt of the console is provided for facilitating getting on and off the seat or adjusting the height of the operation lever at the time of seating in the seat.

For example, Patent Literature 1 discloses a configuration in which two locking pins extending one above the other and parallel to each other are placed at a tilt bracket, the upper locking pin is fixed to a movable frame, and the lower locking pin is locked in a tooth groove part of a fixed frame. This configuration allows the tilt of the movable frame to be changed by changing a position where the lower locking pin is engaged with the tooth groove part of the fixed frame.

PRIOR ART LITERATURE

Patent Literature

Patent Literature 1: Japanese Utility Model Application Publication No. Hei 7-19058

SUMMARY OF INVENTION

Problem to be Solved by Invention

However, the above-described configuration of Patent Literature 1 has a need to rotate the tilt bracket arranged inside a console for changing the tilt of the movable frame. In response to this, to allow the tilt of the console to be changed from outside, a mechanism for rotating the tilt bracket is required to cause a problem of complicating the configuration.

Thus, the present invention is intended to provide a tilt structure allowing the tilt of a console to be changed through simple motion and having a simple configuration, and a console.

Means of Solving Problem

To solve the above-described problem, the present invention is intended for a tilt structure to change the tilt of a console arranged at a lateral part of a seat, comprising: a first frame arranged at the lateral part of the seat; a second frame attached to an upper portion of the first frame in such a manner as to be swingable upward and downward; and a control member attached to the second frame in such a manner as to be tiltable backward and forward through a tilting shaft, wherein the first frame includes a protruding pin, the control member includes a guide part with a groove in which the pin is accommodated, the groove includes a plurality of engagement parts to be engaged with the pin, a locked state and an unlocked state are switchable to each other by causing the control member to make tilting motion, the locked state being a state where the pin is engaged with any of a plurality of the engagement parts, the unlocked state being a state where the pin is disengaged from the engagement part, and the tilt of the second frame relative to the first frame is changed by engaging the pin with an arbitrary engagement part of a plurality of the engagement parts and changing a distance between the tilting shaft and the pin.

Advantageous Effects of Invention

According to the present invention described above, controlling the control member makes it possible to directly switch between the locked state and the unlocked state. This switching motion allows the tilt of the console to be changed. In this way, the tilt of the console can be changed through simple motion. Additionally, the configuration can be simplified.

EMBODIMENTS FOR CARRYING OUT INVENTION

Figure 1:
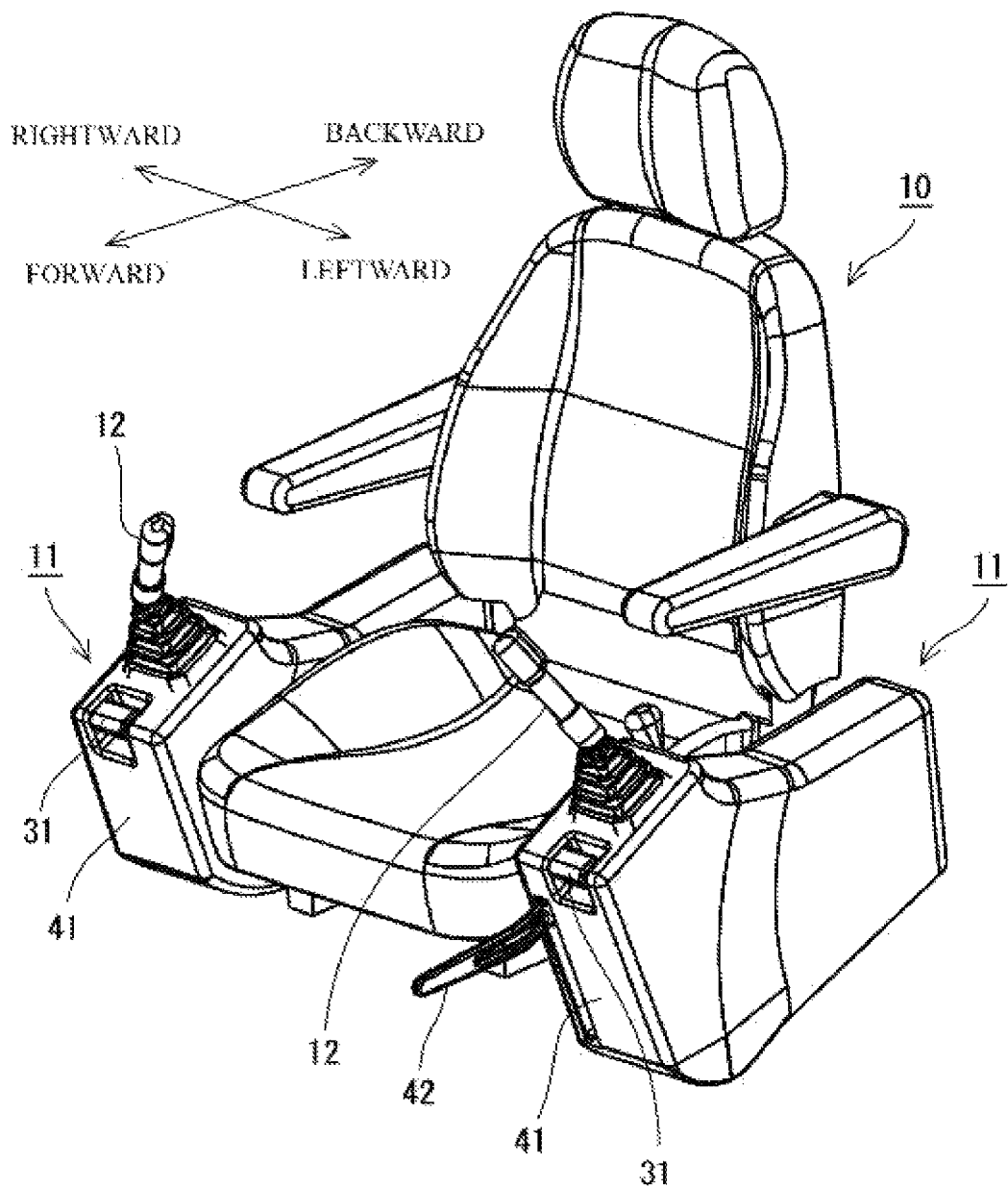
FIG. 1 is a perspective view showing a seat and a console.

An embodiment of the present invention will be described by referring to the drawings. In the following description, a horizontal frontward direction determined when an operator is seated in a seat 10 is called a "forward" direction, and a direction opposite the "forward" direction is called a "backward" direction. Furthermore, with the operator seated in the seat 10 and facing frontward, a left side viewed from the operator is called a "leftward" direction and a right side viewed from the operator is called a "rightward" direction.

A console 11 according to the present embodiment is used in a construction machine such as a hydraulic shovel. In such a construction machine, the seat 10 for an operator is provided in a cabin and the console 11 is arranged at each of both lateral parts of the seat 10. As shown in FIG. 1, the console 11 includes an operation lever 12 for steering provided in a protruding position. An operator controls the operation levers 12 with both hands to do steering such as rotation to the right and left or moving an arm.

While not particularly illustrated in the drawings, a platform for getting on and off the seat 10 is provided further at the back of the console 11 on one side as viewed from the seat 10 (in FIG. 1, the left console 11). Thus, passing in front of the console 11 is required for seating in the seat 10, and an area in front of the console 11 is a platform pathway to the seat 10. This console 11 on one side is provided with a gate lever 42 for interfering with getting on and off during steering. The gate lever 42 can be used for blocking the platform pathway during operation, and for opening the platform pathway during getting on and off by being flipped up.

Figure 2:
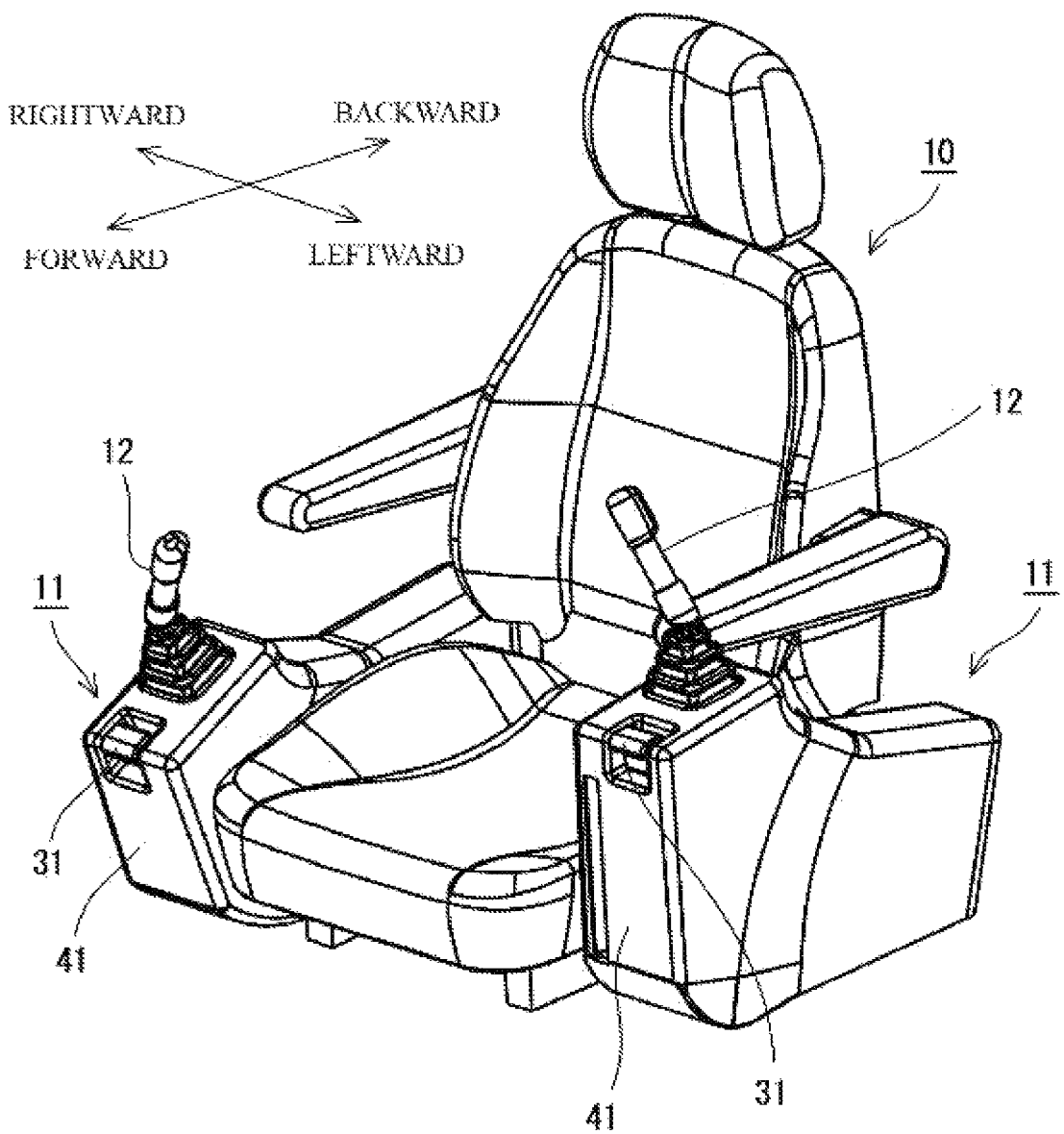
FIG. 2 is a perspective view showing the seat and the console while the tilt of the console is changed.

The console 11 according to the present embodiment includes a tilt structure to change the tilt of the console 11 for facilitating getting on and off the seat 10 or for adjusting the height of the operation lever 12 at the time of seating in the seat 10. For example, as shown in FIG. 2, the operation lever 12 can be moved to a higher position by changing the tilt of the console 11.

Figure 3:
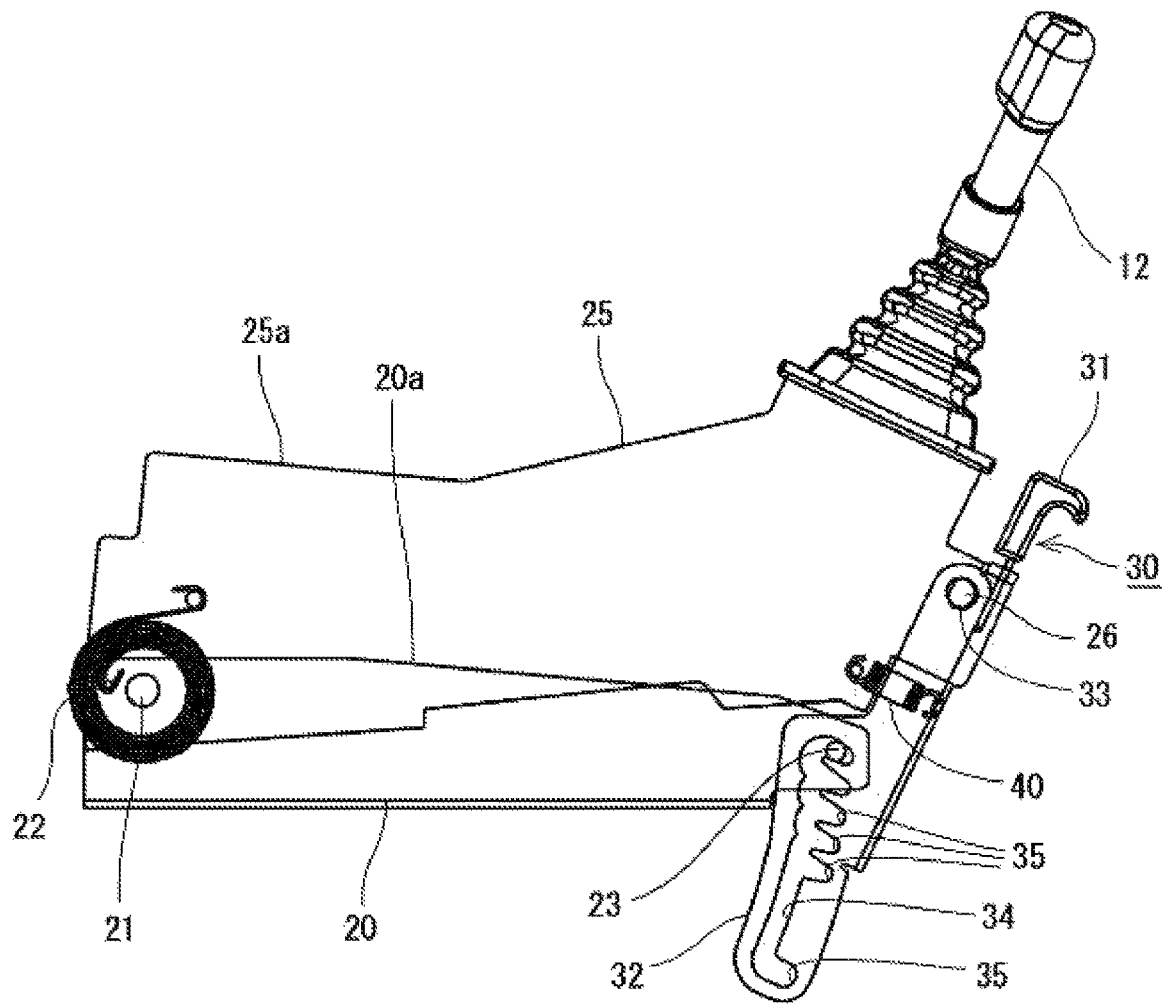
FIG. 3 is a view explaining the interior of the console and showing a locked state where a second frame is at the lowest position.

As shown in FIG. 3, the console 11 includes a first frame 20, a second frame 25, and a control member 30. As shown in FIG. 1, these mechanisms are covered with a frame cover 41 so as not to be exposed to the outside except a controllable part.

The first frame 20 is a frame fixed to a lateral part of the seat 10. The first frame 20 is arranged in such a manner as to face a floor surface. The first frame 20 according to the present embodiment includes a side plate part 20a formed of a metallic plate. A pin 23 protruding in the horizontal direction (right-left direction) is fixed to the side plate part 20a. The pin 23 is arranged adjacent to the front end of the first frame 20 and is slidably inserted into a groove 34 described later.

The second frame 25 is a frame attached to an upper portion of the first frame 20 and arranged in such a manner as to be swingable upward and downward relative to the first frame 20. The second frame 25 according to the present embodiment includes a side plate part 25a formed of a metallic plate. The side plate part 25a of the second frame 25 has a lower end portion arranged in such a manner as to overlap an upper end portion of the side plate part 20a of the first frame 20. A swinging shaft 21 for connecting the side plate parts 20a and 25a while allowing swinging motions of the side plate parts 20a and 25a is provided at a position where the side plate parts 20a and 25a overlap each other at their back portions. In the present embodiment, a damper 22 is arranged around the swinging shaft 21 to apply damping force on the swinging motions of the first frame 20 and the second frame 25. Thus, the second frame 25 is configured in such a manner that, even in a swingable state (an unlocked state described later), the second frame 25 does not swing steeply but is caused to swing gently.

The control member 30 is a lever to be controlled by an operator in changing the tilt of the console 11 and is attached to the second frame 25 in such a manner as to be tiltable backward and forward. The control member 30 according to the present embodiment is connected in a tiltable manner to the second frame 25 through a tilting shaft 26 provided in the vicinity of the front end of the second frame 25. The tilting shaft 26 is a horizontal shaft like the pin 23 of the first frame 20 and is arranged forward of the pin 23.

Figure 4:
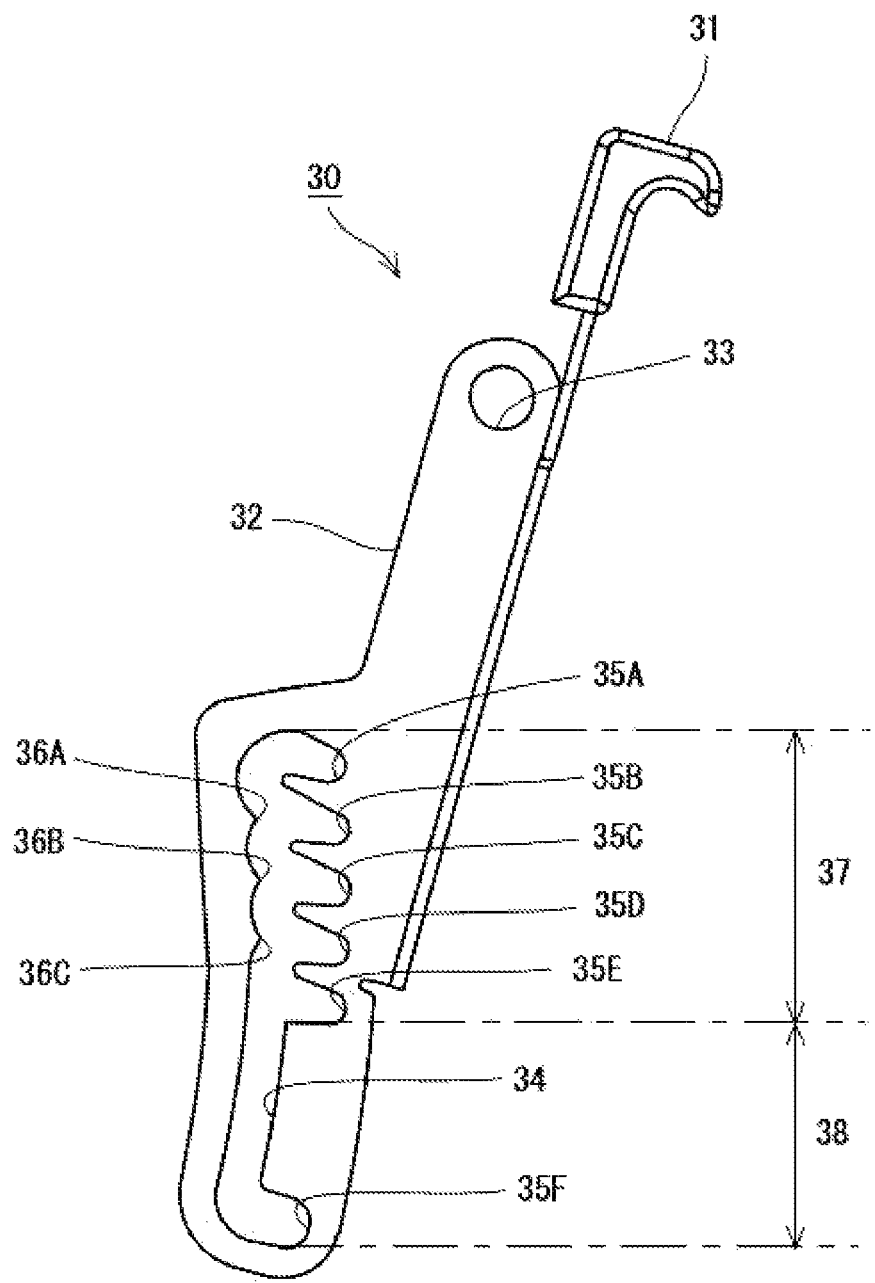
FIG. 4 is a side view of a control member.

As shown in FIG. 4, the control member 30 includes a grip part 31 for causing tilting motion of the control member 30, and a guide part 32 with the groove 34.

The grip part 31 is provided in the vicinity of the upper end of the control member 30 and is exposed to the outside of the frame cover 41 for allowing control by an operator as shown in FIG. 1, etc. The grip part 31 according to the present embodiment is formed into an inverted L-shape with a tip protruding forward. The operator grips the grip part 31 of the inverted L-shape to allow implementation of tilting motion of the control member 30.

The guide part 32 is a plate-like member arranged below the grip part 31. A penetrating shaft hole 33 for insertion of the above-described tilting shaft 26 is formed in the vicinity of the upper end of the guide part 32. The penetrating groove 34 in which the above-described pin 23 is slidably accommodated is formed below the shaft hole 33.

As shown in FIG. 4, the groove 34 is an odd-formed long hole extending in the upward-downward direction, and includes a plurality of engagement parts 35 allowing the pin 23 to be latched. The engagement part 35 is formed by partially bulging the groove 34 forward so as to allow hooking of the pin 23 thereon. After the pin 23 slides along the groove 34, the pin 23 gets into the engagement part 35 and is latched thereon, thereby allowing the pin 23 to be fixed to the engagement part 35.

The engagement part 35 according to the present embodiment is formed in such a manner as to be tapered gradually in a direction toward a tip. In this formation, a large entrance of the engagement part 35 is formed to facilitate guide of the pin 23 into the engagement part 35, and the pin 23 in the engagement part 35 is prohibited from rattling.

The groove 34 according to the present embodiment includes a plurality of the engagement parts 35, and the pin 23 is movable between these engagement parts 35. The engagement parts 35 are formed in a plurality of tiers defined one above the other, and determining the engagement part 35 with which the pin 23 is to be engaged changes the height of the control member 30 (and that of the second frame 25 coupled to the control member 30).

To change the position of the pin 23 in the groove 34, the control member 30 is caused to make tilting motion. Causing the control member 30 to make tilting motion makes it possible to switch between a locked state where the pin 23 is latched on any of a plurality of the engagement parts 35 and an unlocked state where the pin 23 is disengaged from the engagement part 35. As the pin 23 is locked in the groove 34 in the locked state, the second frame 25 is prohibited from swinging relative to the first frame 20. By contrast, the pin 23 is slidable along the groove 34 in the unlocked state. Causing the pin 23 to slide along the groove 34 in this way allows the second frame 25 to swing relative to the first frame 20, thereby allowing the tilt of the second frame 25 to be changed.

While the control member 30 according to the present embodiment is tiltable about the tilting shaft 26, it is always biased by a biasing member 40 such as a spring. More specifically, in a natural state, the grip part 31 is biased forward and a lower portion of the guide part 32 (a portion provided with the groove 34) is biased backward.

Thus, in an uncontrolled natural state, the control member 30 is biased in a direction of engaging the pin 23 with the engagement part 35, specifically, the control member 30 is biased in a direction of maintaining the locked state. By holding the grip part 31 and pulling the grip part 31 toward a near side (backward) in this natural state, the control member 30 is caused to tilt against the biasing member 40 to allow a shift from the locked state to the unlocked state. Then, the grip part 31 is released from the pulling to cause the control member 30 to tilt under the bias of the biasing member 40. By doing so, the unlocked state can be shifted automatically to the locked state.

Figure 5:
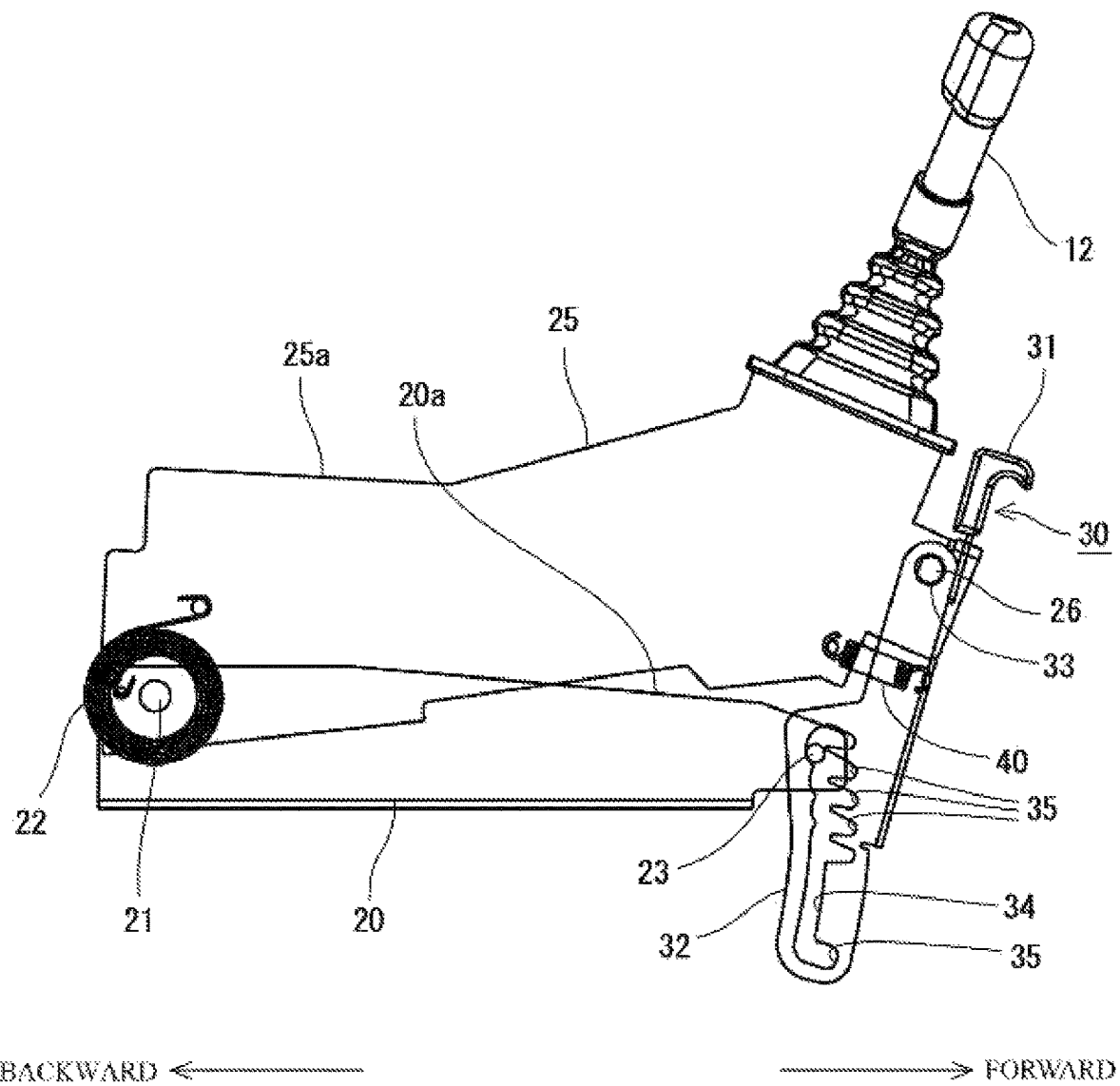
FIG. 5 is a view explaining the interior of the console and showing an unlocked state.
Figure 6:
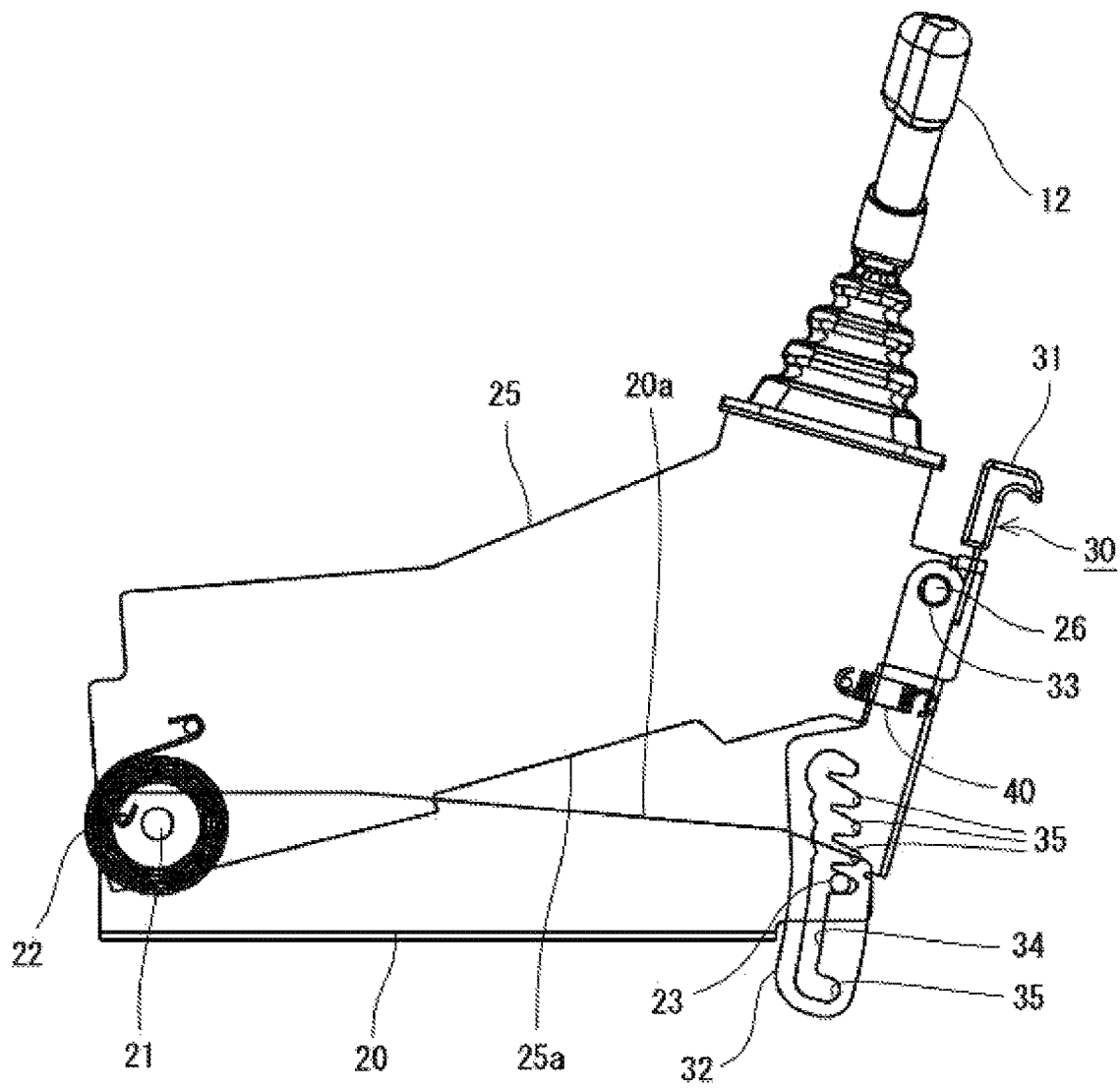
FIG. 6 is a view explaining the interior of the console and showing the locked state where the second frame is moved upward.

For example, pulling the grip part 31 toward the near side makes it possible to switch from the locked state such as that shown in FIG. 3 to the unlocked state such as that shown in FIG. 5. As a result of this motion, the pin 23 is disengaged from the engagement part 35 to allow the pin 23 to slide along the groove 34. Lifting and lowering the second frame 25 in this state allows the tilt of the second frame 25 to be changed. After the second frame 25 is set at an arbitrary height, the grip part 31 is released and the control member 30 is returned to a position before the tilt. By doing so, the pin 23 gets into the engagement part 35 to form the locked state as shown in FIG. 6 to fix the second frame 25 at the set height.

As described above, the tilt structure according to the present embodiment is configured in such a manner that, by determining the engagement part 35 of a plurality of the engagement parts 35 with which the pin 23 is to be engaged, a distance between the tilting shaft 26 and the pin 23 is changed to change the tilt of the second frame 25.

As shown in FIG. 4, the groove 34 according to the present embodiment includes a guideway 36 provided at a surface facing the above-described engagement part 35. The guideway 36 is a protrusion protruding from the inner surface of the groove 34 toward a direction of the engagement part 35, and is provided to allow the pin 23 to be guided easily to the engagement part 35. As shown in FIG. 4, the guideway 36 is a substantially doglegged protrusion with upper and lower tilting surfaces. The guideway 36 protrudes inward of the groove 34 so as to cause the pin 23 to abut on the guideway 36 in lifting and lowering the second frame 25 in the unlocked state. As a result of the abutting contact of the pin 23 with the tilting surface of the groove 34, the pin 23 is guided toward a direction of the engagement part 35 to allow the pin 23 to easily get into the engagement part 35. Additionally, an operator is allowed to see a rough position of the engagement part 35 on the basis of a touch given by abutting contact of the pin 23 with the guideway 36. Thus, the operator becomes capable of determining timing of releasing the grip part 31 (timing of shifting to the locked state).

As shown in FIG. 4, the groove 34 according to the present embodiment is composed of a first section 37 with a plurality of the engagement parts 35 arranged at a constant interval, and a second section 38 provided under the first section 37 and including one engagement part 35 provided at a greater interval than the constant interval. In this configuration, the height of the console 11 (operation lever 12) can be adjusted using the first section 37 while the console 11 can be flipped up using the second section 38.

Specifically, in response to an intention to arrange the operation lever 12 at a position suited to the physical size of an operator through fine adjustment of the height of the console 11, a plurality of the engagement parts 35 in the first section 37 (engagement parts 35A to 35E) may be used to determine the height of the console 11.

Figure 7:
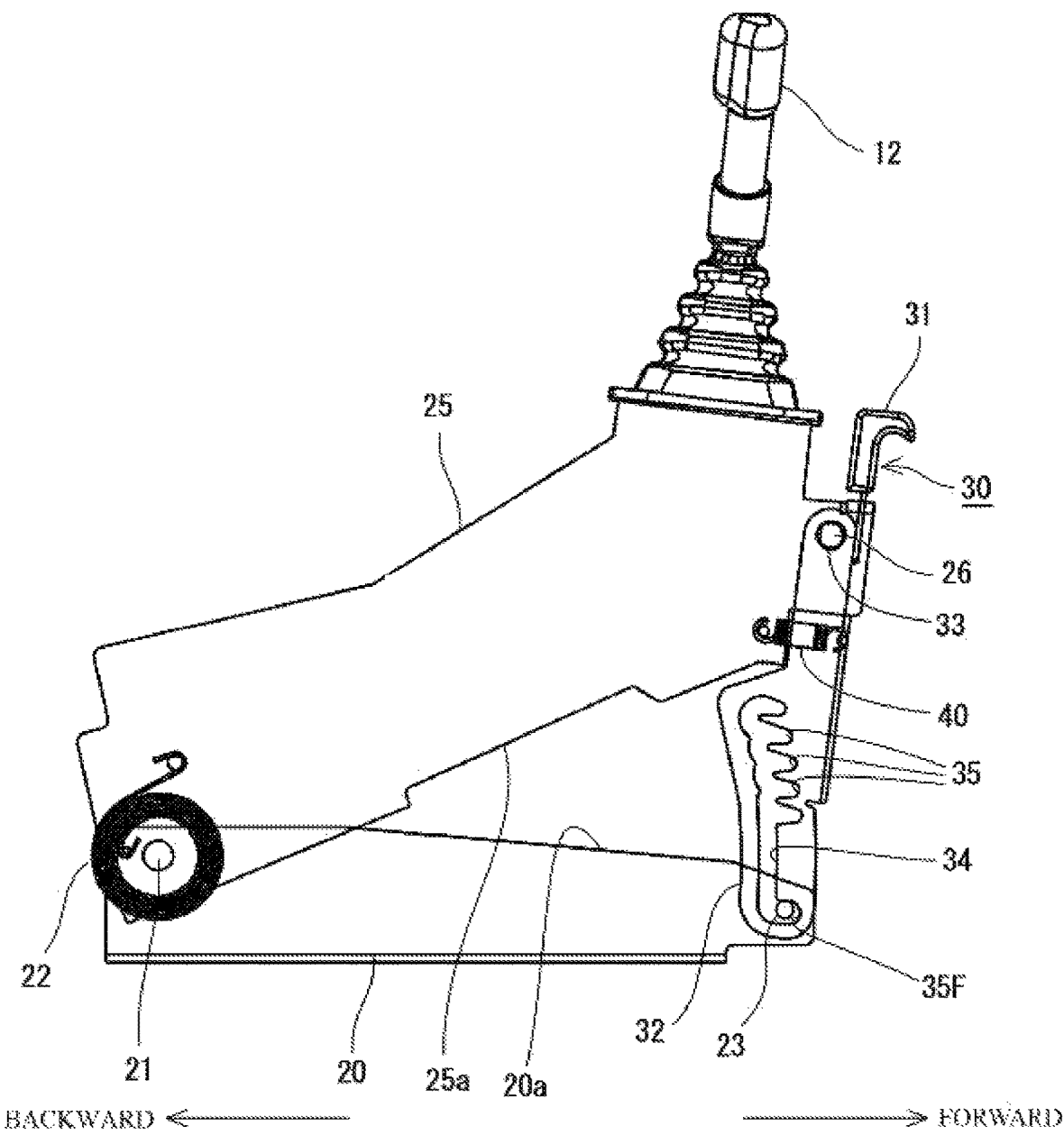
FIG. 7 is a view explaining the interior of the console and showing the locked state where the second frame is at the highest position.

In response to an intention to facilitate getting on and off the seat 10 by flipping up the console 11, the console 11 can be flipped up largely by using an engagement part 35F provided in the second section 38 as shown in FIG. 7. In this case, the gate lever 42 may be flipped up simultaneously.

As described above, according to the present embodiment, controlling the control member 30 makes it possible to directly switch between the locked state and the unlocked state. This switching motion allows the tilt of the console 11 (those of the second frame 25 and the frame cover 41) to be changed. In this way, the tilt of the console 11 can be changed through simple motion. Additionally, the configuration can be simplified.

As the grip part 31 is arranged above and the groove 34 is arranged below across the tilting shaft 26, it is possible to switch between the locked state and the unlocked state without controlling the grip part 31 largely (only by moving the grip part 31 slightly).

The control member 30 is arranged on the front of the console 11, and pulling the grip part 31 toward the near side disengages the pin 23 from the engagement part 35 to form the unlocked state. In this configuration, in changing the height of the second frame 25 while holding the second frame 25, the second frame 25 is naturally placed in the held posture through pulling of the grip part 31. Thus, the second frame 25 can be lifted and lowered easily with one hand.

(Modification)

In the above-described embodiment, the first frame 20 is fixed to a lateral part of the seat 10. However, the configuration is not limited to this but may be determined in such a manner as to flip up the first frame 20 to an upper position. This can facilitate getting on and off the seat 10 further. More specifically, in the above-described embodiment, only the second frame 25 is to be flipped up using the engagement part 35F in the second section 38 (see FIG. 7). Instead, the first frame 20 supporting the second frame 25 may be flipped up to an upper position.

FIGS. 8 to 14 are views explaining a modification configured to flip up the first frame 20 to an upper position. The modification of the present embodiment will be described by referring to these drawings.

The control member 30 according to the present modification has a different shape from that of the above-described embodiment and is provided at a different position from that of the above-described embodiment. While this control member 30 has a difference in terms of the absence of the second section 38 (engagement part 35F), it does not differ from the control member 30 according to the above-described embodiment in terms of function or action. Thus, descriptions of the configuration and action of the control member 30 according to the present modification will be omitted.

Figure 8:
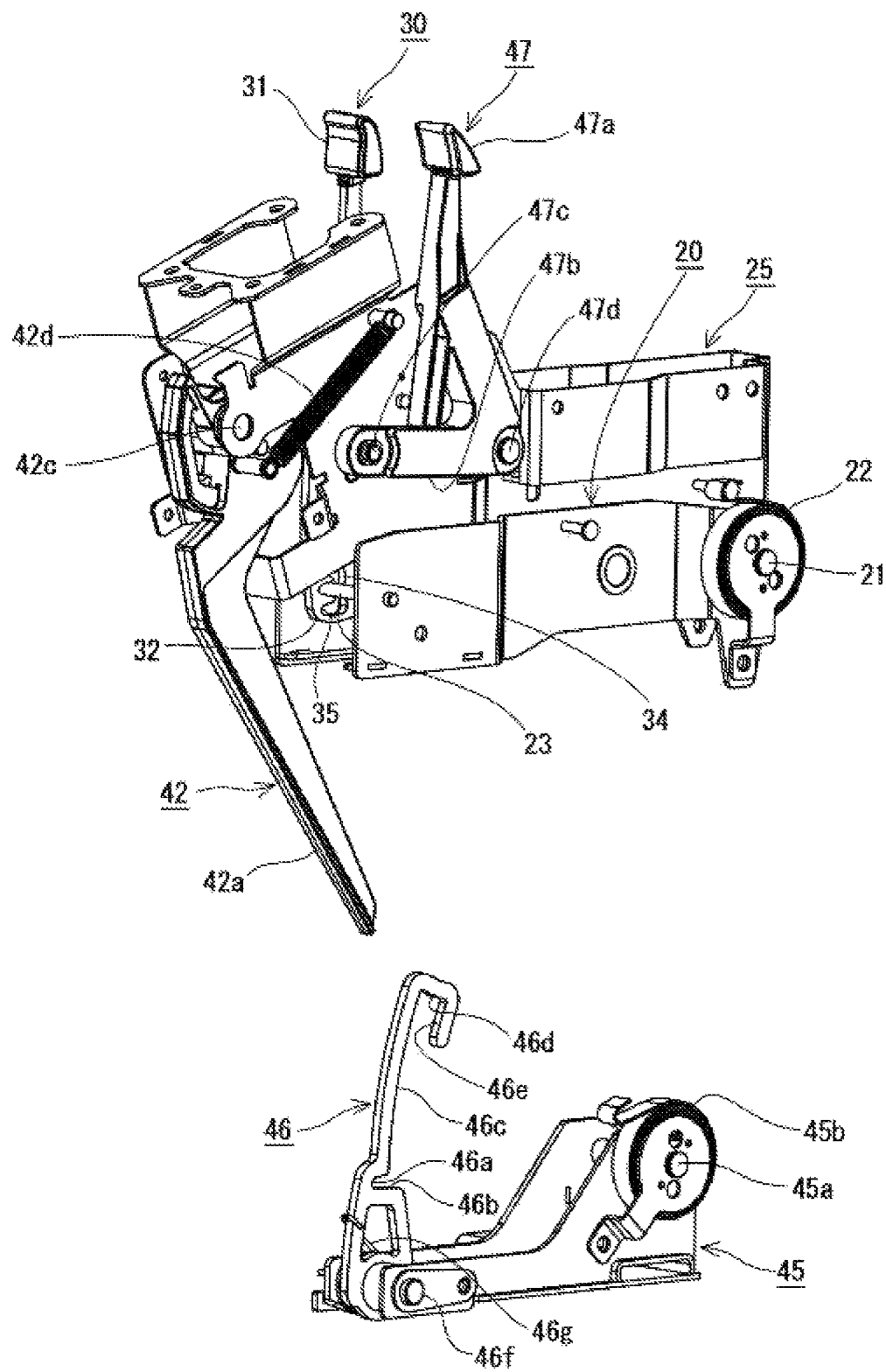
FIG. 8 is a view showing an internal configuration of a console according to a modification before incorporation of a third frame.
Figure 9:
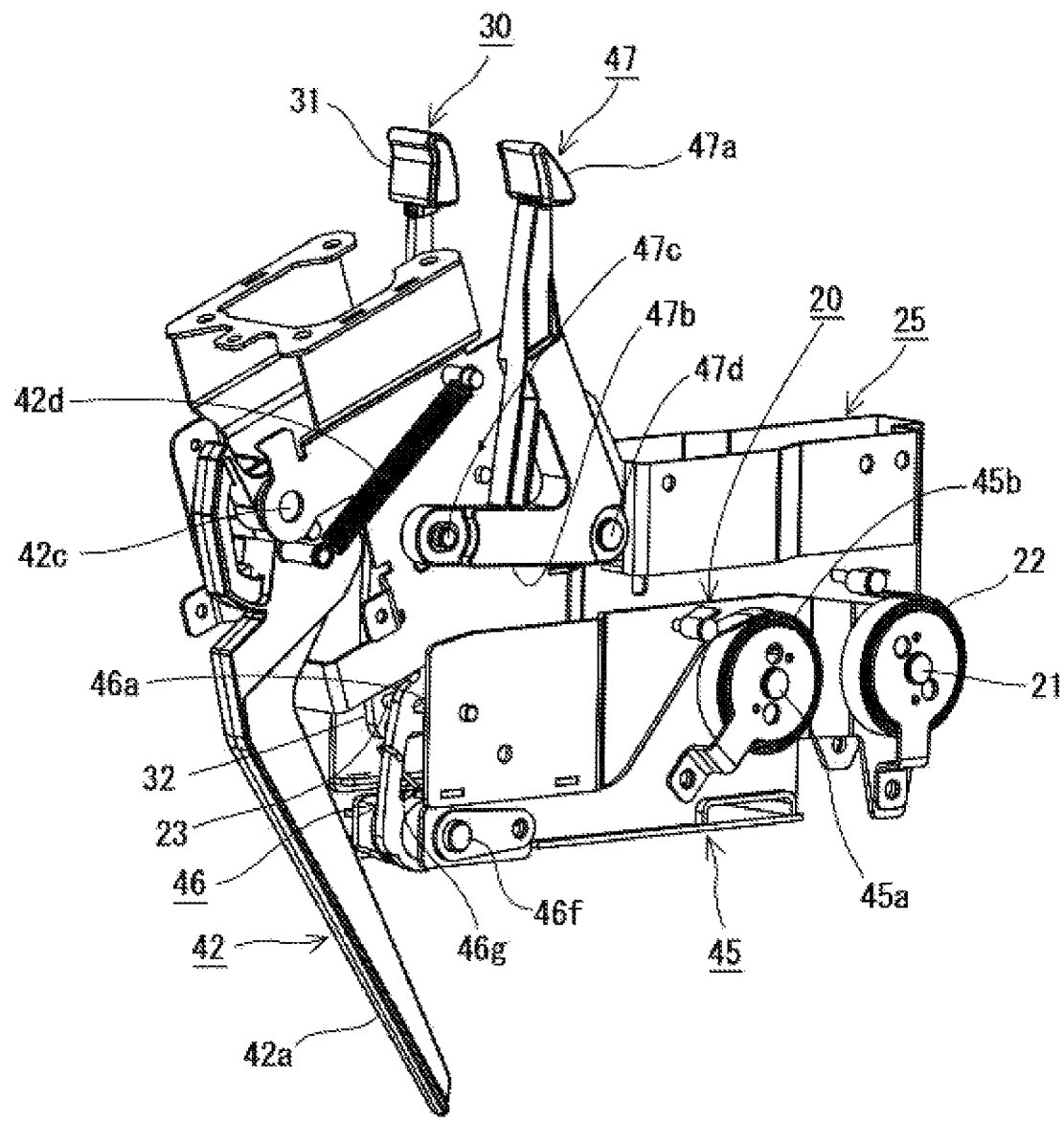
FIG. 9 is a view showing the internal configuration of the console according to the modification after incorporation of the third frame.

As shown in FIGS. 8 and 9, the console 11 according to the present modification includes a third frame 45 supporting the first frame 20 in such a manner as to be swingable upward and downward, a flip-up stopper 46 for suppressing flip-up of the first frame 20, a flip-up control member 47 for controlling the flip-up stopper 46, and the gate lever 42 rotatably attached to the second frame 25.

The third frame 45 is fixed to a lateral part of the seat 10 below the first frame 20. As shown in FIGS. 8 and 9, a flip-up swinging shaft 45a is provided in the vicinity of the back end of the third frame 45 for supporting the first frame 20 in a swingable manner. A flip-up damper 45b is arranged around the flip-up swinging shaft 45a. The flip-up damper 45b is to apply bias in such a manner as to flip up the first frame 20 to an upper position and to apply damping force so as to prevent the first frame 20 from swinging vigorously. The first frame 20 is configured in such a manner that, when the restriction imposed by the flip-up stopper 46 described later is removed, the first frame 20 swings upward gently under the biasing force of the flip-up damper 45b to be flipped up to a predetermined position. More specifically, the first frame 20 can be flipped up from a lower position shown in FIG. 13(a) and to an upper position shown in FIG. 13(b).

The flip-up stopper 46 is to fix the first frame 20 to the lower position against the biasing force of the flip-up damper 45b described above. More specifically, the pin 23 fixed to the first frame 20 is engaged with the flip-up stopper 46 to fix the first frame 20 to the lower position.

Figure 10:
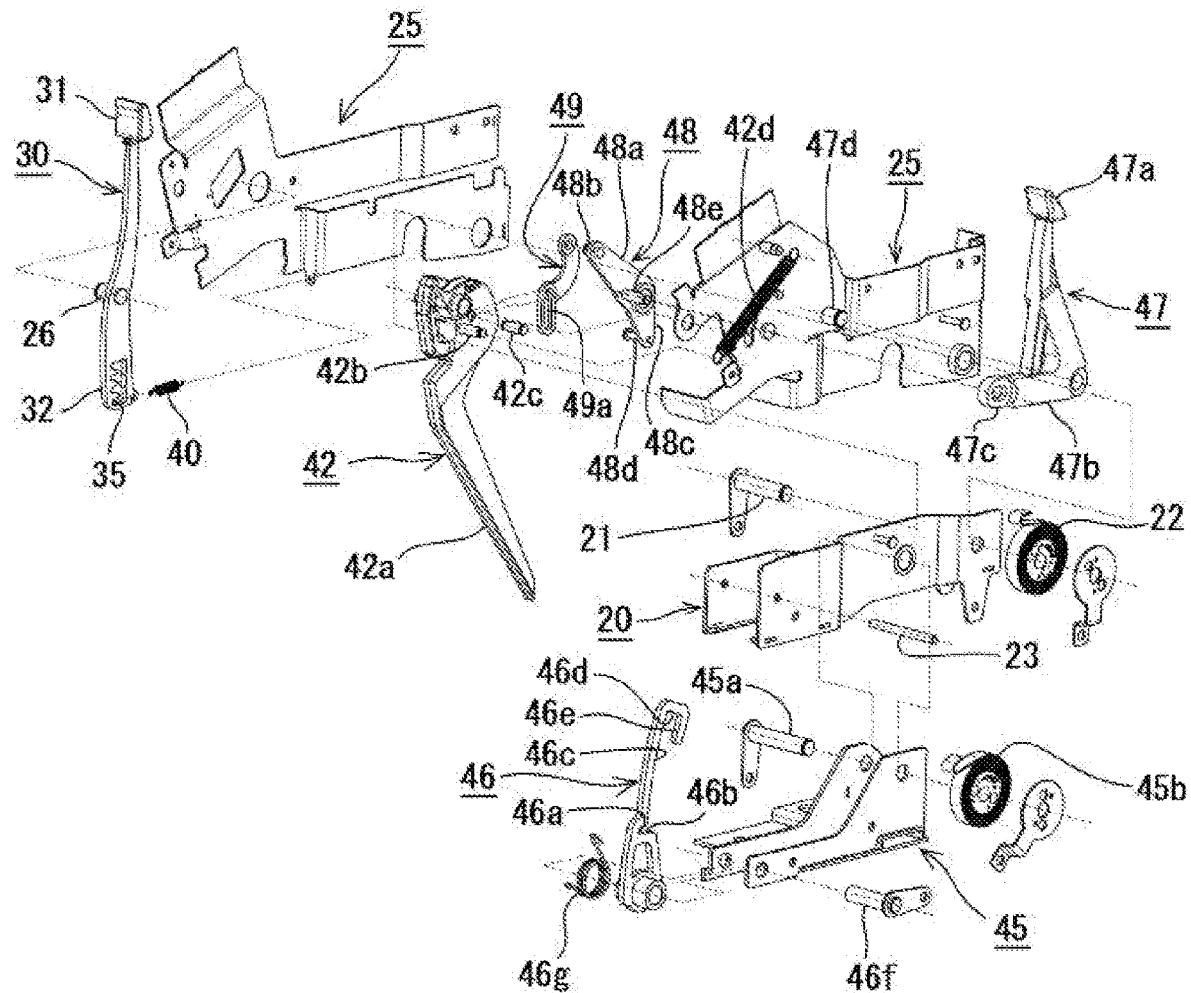
FIG. 10 is an exploded view for explaining parts constituting the console according to the modification.
Figure 11:
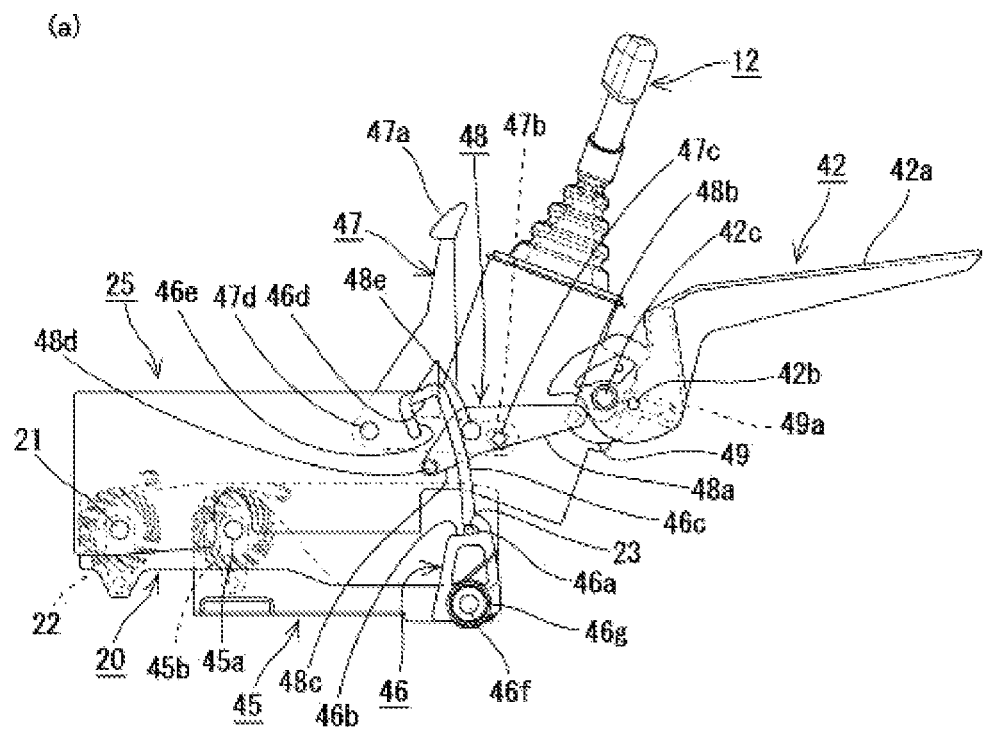
FIG. 11 is a view explaining motion of the console according to the modification (a control member of a tilt structure is omitted), and includes a view (a) showing a state where a gate lever is at a blocking position and a view (b) showing a state where the gate lever is at a retreating position.
Figure 11:
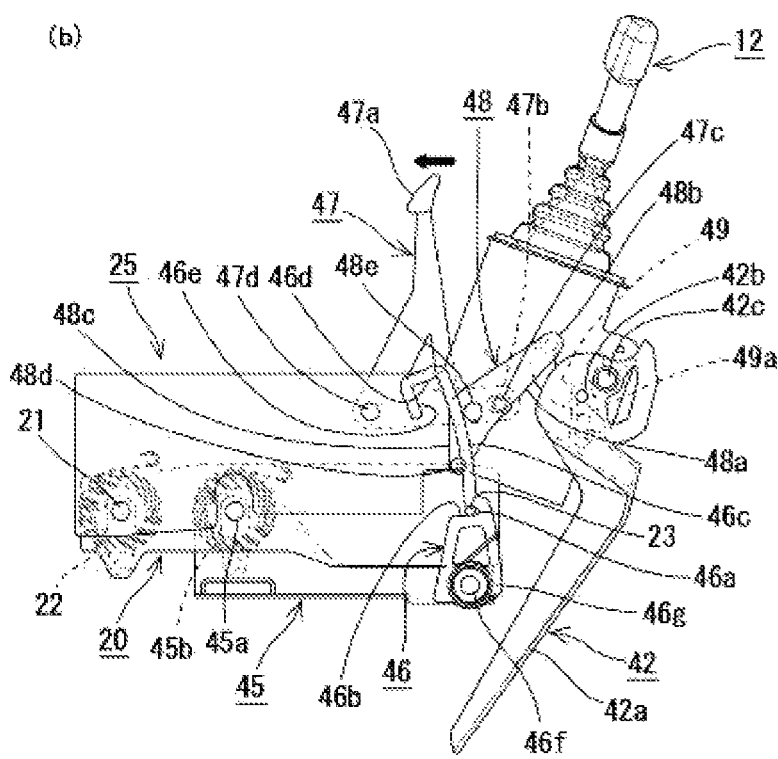

As shown in FIGS. 8 and 10, the flip-up stopper 46 according to the present modification is supported by a stopper swinging shaft 46f in such a manner as to be swingable at a lower end and the vicinity thereof. This allows the flip-up stopper 46 to swing backward and forward relative to the third frame 45. The flip-up stopper 46 is always biased backward (in a direction of being engaged with the pin 23) by a stopper spring 46g.

The flip-up stopper 46 includes an arm part 46c extending upward, and the arm part 46c has a tip bent into an inverted J shape. A latching part 46a with which the pin 23 is engageable and from which the pin 23 is disengageable is provided below the arm part 46c. The latching part 46a has a shape recessed forward, and the pin 23 can be engaged with the latching part 46a by getting into the recess.

A lower restricting part 46b for interfering with downward movement of the pin 23 is provided below the latching part 46a. The lower restricting part 46b juts out backward in such a manner as to be continuous with the lower edge of the latching part 46a. The lower restricting part 46b juts out backward further than the edge line of the interior (backward side) of the arm part 46c, thereby imposing restriction to prohibit the pin 23 from moving downward further than the lower restricting part 46b.

The upper end of the arm part 46c (where the arm part 46c is bent into an inverted J shape) is provided with an upper restricting part 46d and a tip hook 46e. The upper restricting part 46d is a part to impose restriction to prohibit the second frame 25 from being flipped up beyond a predetermined range, and extends backward from the upper end of the arm part 46c. The tip hook 46e is a part to impose restriction to prohibit the gate lever 42 from protruding forward while the console 11 is in a flipped-up state, and extends downward from the back end of the upper restricting part 46d.

In this configuration, while the pin 23 is engaged with the latching part 46a, the first frame 20 is fixed to the lower position against the biasing force of the flip-up damper 45b as shown in FIGS. 11(a) and 12(a). In this state, as the flip-up stopper 46 is biased in a direction of making engagement with the pin 23, the first frame 20 is retained at the lower position unless the flip-up stopper 46 swings forward.

When the flip-up control member 47 described later is controlled in this state to cause the flip-up stopper 46 to swing forward, the pin 23 is disengaged from the latching part 46a as shown in FIGS. 13(a) and 14(a). After the pin 23 is disengaged from the latching part 46a, the first frame 20 moves upward gently under the biasing force of the flip-up damper 45b. At this time, the pin 23 fixed to the first frame 20 also moves upward integrally. As the flip-up stopper 46 is biased in the direction toward the pin 23, the interior of the arm part 46c is pressed against the pin 23. In other words, the pin 23 moves upward along the edge line of the interior of the arm part 46c. As shown in FIGS. 13(b) and 14(b), the first frame 20 can move upward to a position where a stopper pressing part 48d (described later) abuts on the upper restricting part 46d. When the stopper pressing part 48d abuts on the upper restricting part 46d, the first frame 20 and the second frame 25 become incapable of moving further to be fixed to their upper positions resulting from the flip-up.

In this state, the first frame 20 can be lowered again to the lower position by depressing the first frame 20 from above the second frame 25. As shown in FIGS. 11(a) and 12(a), as a result of depressing the first frame 20 to a position where the pin 23 abuts on the lower restricting part 46b, the pin 23 and the latching part 46a are engaged with each other under the biasing force of the stopper spring 46g. Thus, even in the absence of the force of depressing the first frame 20, the first frame 20 can still be fixed to the lower position.

Figure 12:
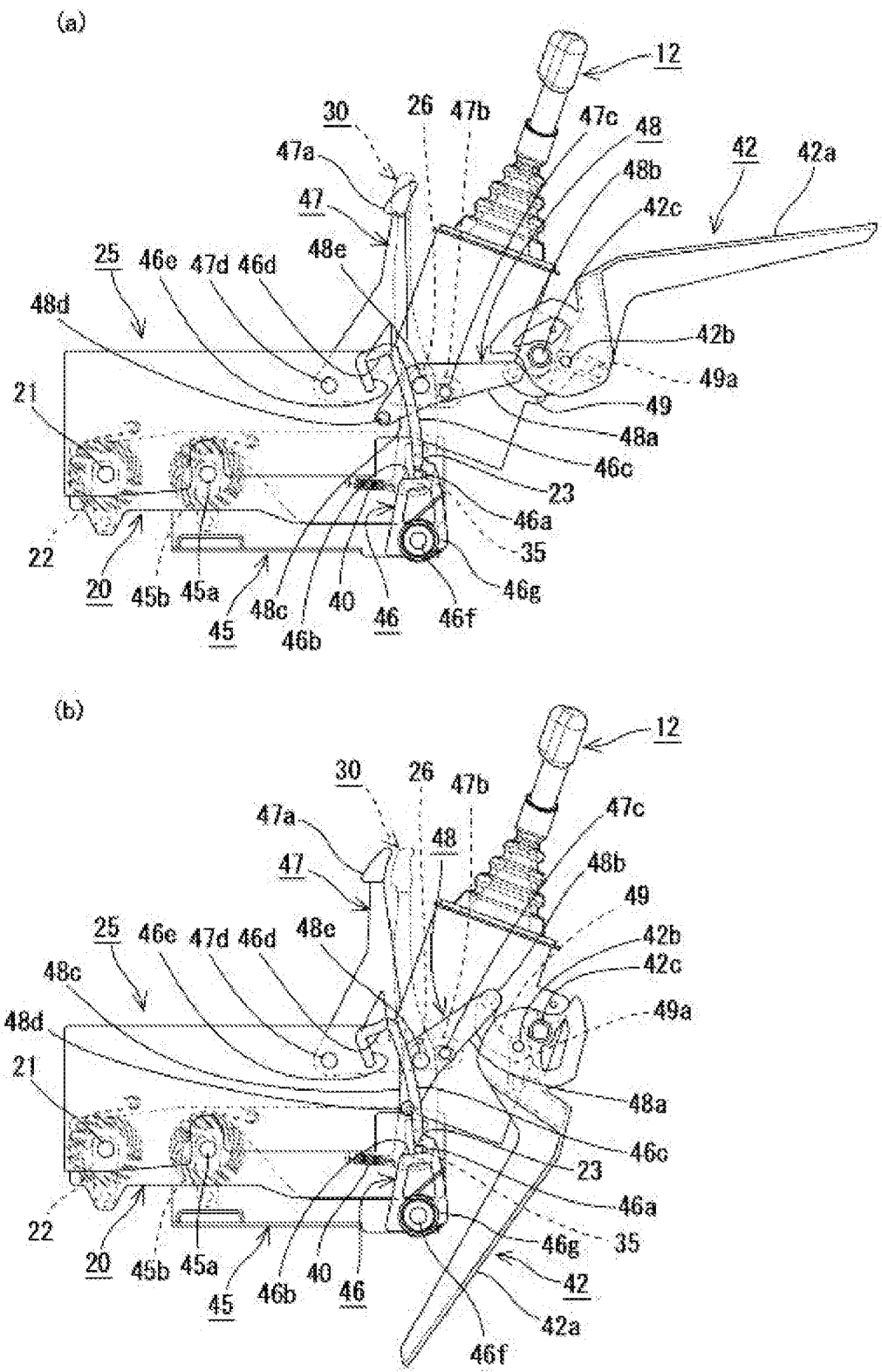
FIG. 12 is a view explaining motion of the console according to the modification (the control member of the tilt structure is shown by alternate long and two short dashes lines), and includes a view (a) showing a state where the gate lever is at the blocking position and a view (b) showing a state where the gate lever is at the retreating position.
Figure 13:
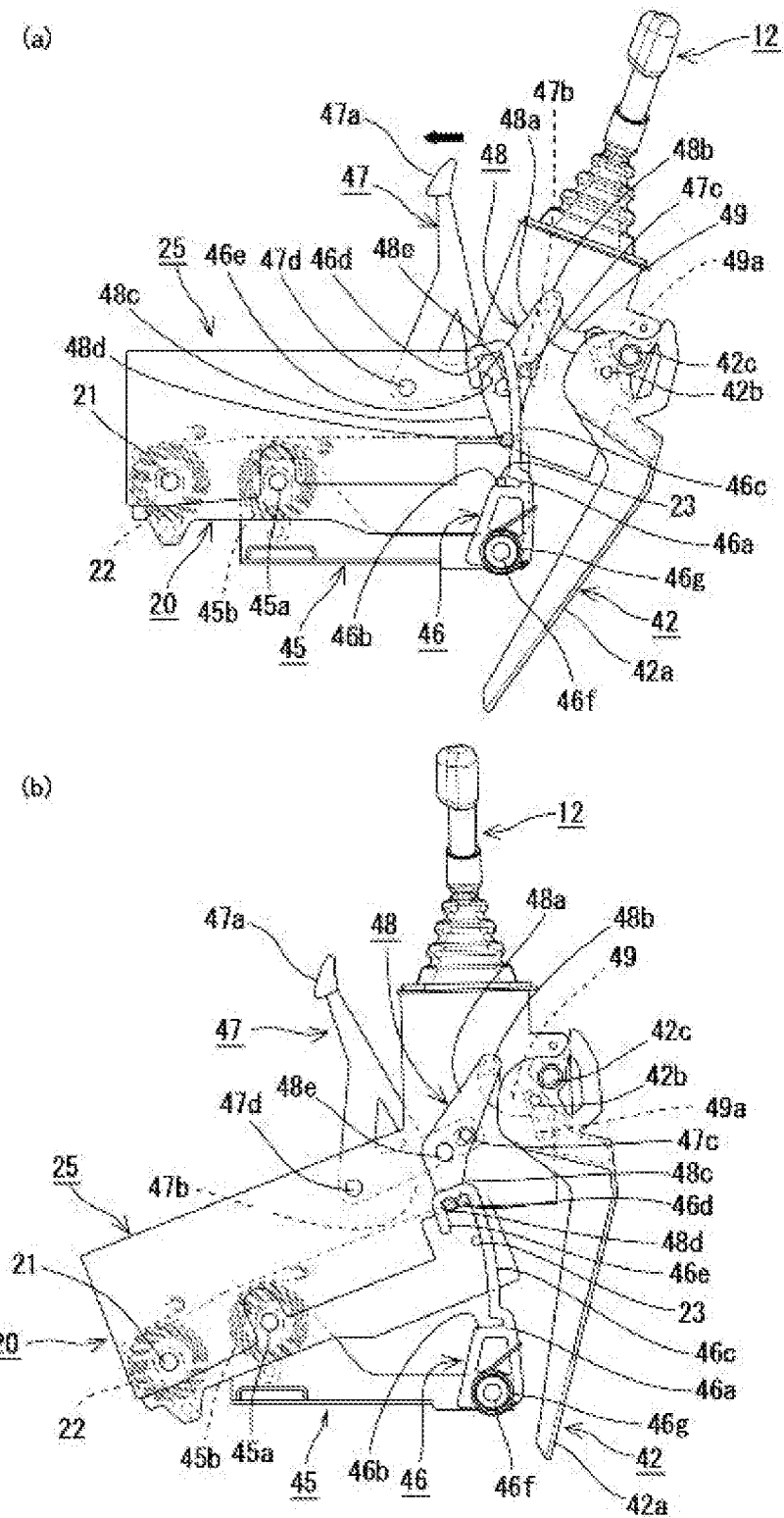
FIG. 13 is a view explaining motion of the console according to the modification (the control member of the tilt structure is omitted), and includes a view (a) showing a state where a first frame is at a lower position and a view (b) showing a state where the first frame is flipped up to an upper position.
Figure 14:
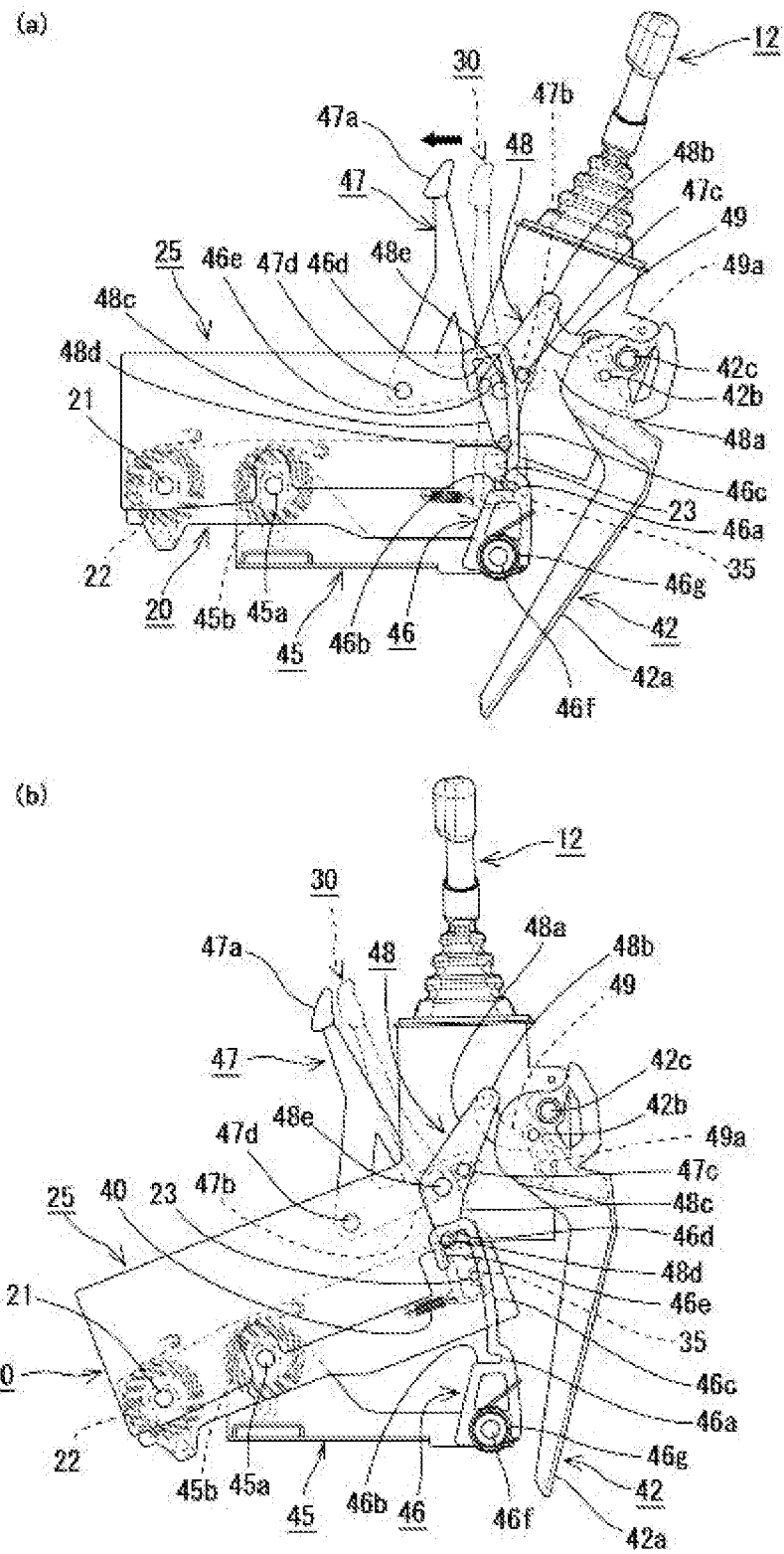
FIG. 14 is a view explaining motion of the console according to the modification (the control member of the tilt structure is shown by alternate long and two short dashes lines), and includes a view (a) showing a state where the first frame is at the lower position and a view (b) showing a state where the first frame is flipped up to the upper position.

As shown in FIGS. 12 and 14, even when the first frame 20 pivots upward and downward relative to the third frame 45, engagement between the pin 23 and the engagement part 35 is still maintained as it is. In other words, the first frame 20 is pivotable relative to the third frame 45 while the tilt of the console 11 (the tilt of the second frame 25 relative to the first frame 20) is maintained. In this configuration, the tilt of the console 11 does not change between before and after the flip-up motion, making it possible to maintain a tilt position even on the occurrence of getting on and off by an operator.

The flip-up control member 47 is a lever to be controlled by an operator in flipping up the console 11 or controlling the gate lever 42. The flip-up control member 47 is attached to the second frame 25 in such a manner as to be tiltable backward and forward. The flip-up control member 47 according to the present modification is attached in a tiltable manner to the second frame 25 through a pivotal shaft 47d provided to the second frame 25. As shown in FIG. 12, etc., the flip-up control member 47 is arranged backward of the operation lever 12. Arranging the flip-up control member 47 backward of the operation lever 12 in this way realizes a configuration in which the operation lever 12 is unlikely to be touched erroneously during flip-up motion or during control over the gate lever 42. In the present modification, the control member 30 is also arranged backward of the operation lever 12, and the control member 30 and the flip-up control member 47 are arranged side by side.

The flip-up control member 47 is a substantially L-shaped member as shown in FIGS. 8 to 10, and is supported at the vicinity of the substantially L-shaped bent portion by the pivotal shaft 47d. The flip-up control member 47 has an upper end portion provided with a grasping part 47a. The flip-up control member 47 includes a forward protrusion 47b protruding forward from the position of the pivotal shaft 47d.

The grasping part 47a is a part to be grasped by an operator in causing tilting motion of the flip-up control member 47. Like the grip part 31 of the control member 30, the grasping part 47a is exposed to the outside of the frame cover 41 for allowing control by an operator.

The forward protrusion 47b is a part provided for connecting a first link member 48 described later. The forward protrusion 47b has a tip provided with a first link connection 47c for connecting the first link member 48 rotatably.

The first link member 48 such as that shown in FIGS. 10 to 14 is rotatably connected to the first link connection 47c. The first link member 48 is rotatably attached to the second frame 25 through a link swinging shaft 48e. The first link member 48 includes a first arm part 48a protruding forward of the link swinging shaft 48e, and a second arm part 48c protruding backward of the link swinging shaft 48e.

The first arm part 48a has a tip with a second link connection 48b for connecting a second link member 49 rotatably described later. The first link connection 47c described above is connected at a position between the link swinging shaft 48e and the second link connection 48b to the first arm part 48a.

The second arm part 48c has a tip with the stopper pressing part 48d provided in such a manner as to face the arm part 46c of the flip-up stopper 46. The stopper pressing part 48d is to press the flip-up stopper 46 forward in an interlocking relationship with the motion of the flip-up control member 47.

The second link member 49 such as that shown in FIGS. 10 to 14 is rotatably connected to the second link connection 48b of the first link member 48 described above. The second link member 49 is provided with an arc-like guide 49a for engagement with the gate lever 42 described later. The arc-like guide 49a is an arc-like groove or hole. A guide pin 42b of the gate lever 42 described later is slidably inserted into the arc-like guide 49a.

The gate lever 42 is to interfere with getting on and off the seat 10 during steering, and is rotatably attached to the second frame 25 through a gate lever swinging shaft 42c. The gate lever 42 can be placed at a blocking position of blocking a platform pathway to the seat 10 as shown in FIG. 11(a), and a retreating position of retreating from the pathway to the seat 10 as shown in FIG. 11(b). At the blocking position, a blocking part 42a of the gate lever 42 protrudes forward of the gate lever swinging shaft 42c to interfere with getting on and off the seat 10 by an operator. At the retreating position, the blocking part 42a of the gate lever 42 is pointed downward to open the platform pathway.

The gate lever 42 is always biased backward by a gate lever spring 42d (see FIGS. 8 and 9). The gate lever spring 42d according to the present modification is a tension spring configured to expand most at a position between the blocking position and the retreating position. The gate lever spring 42d applies biasing force to hold the gate lever 42 at the retreating position or the blocking position. To move the gate lever 42 from the blocking position to the retreating position or from the retreating position to the blocking position, the gate lever 42 is required to be controlled against the biasing force of the gate lever spring 42d (by getting over the position where the gate lever spring 42d expands most).

The gate lever 42 includes the guide pin 42b parallel to the gate lever swinging shaft 42c. As already described above, the guide pin 42b is inserted into the arc-like guide 49a of the second link member 49. Thus, as the second link member 49 moves forward, the guide pin 42b inserted in the arc-like guide 49a also moves forward to rotate the gate lever 42 forward. On the other hand, as the second link member 49 moves backward, the guide pin 42b inserted in the arc-like guide 49a also moves backward to rotate the gate lever 42 backward (downward).

The gate lever 42 according to the present modification is controllable by the flip-up control member 47.

Specifically, when the gate lever 42 is at the blocking position shown in FIG. 11(a), the flip-up control member 47 is located at a first position that is the most forward position. Pulling the flip-up control member 47 backward in this state moves the flip-up control member 47 to a second position, as shown in FIG. 11(b). When the flip-up control member 47 moves to the second position, the first link connection 47c is pulled up to cause the first link member 48 to pivot about the link swinging shaft 48e, thereby moving the second link connection 48b backward. In response to this, the second link member 49 moves backward to attract the guide pin 42b backward. As a result, the gate lever 42 moves to the retreating position.

On the other hand, when the gate lever 42 is at the retreating position shown in FIG. 11(b), the flip-up control member 47 is located at the second position. Pressing the flip-up control member 47 forward in this state moves the flip-up control member 47 to the first position, as shown in FIG. 11(a). When the flip-up control member 47 moves to the first position, the first link connection 47c is depressed to cause the first link member 48 to pivot about the link swinging shaft 48e, thereby moving the second link connection 48b forward. In response to this, the second link member 49 moves forward to press the guide pin 42b forward. As a result, the gate lever 42 moves to the blocking position.

In the present modification, the flip-up control member 47 can also be used for causing flip-up motion of the first frame 20, and this flip-up motion can be made continuously with the retreating motion of the gate lever 42.

Specifically, the present modification is configured in such a manner that, when the flip-up control member 47 is controlled from the first position shown in FIG. 11(a) to the second position shown in FIG. 11(b), and further to a third position shown in FIG. 13(a), the latching part 46a of the flip-up stopper 46 and the pin 23 are disengaged from each other to flip up the first frame 20.

More specifically, by pulling the flip-up control member 47 further from the second position shown in FIG. 11(b), the flip-up control member 47 moves to the third position as shown in FIG. 13(a). When the flip-up control member 47 moves to the third position, the first link connection 47c is lifted to cause the first link member 48 to pivot about the link swinging shaft 48e. At this time, the stopper pressing part 48d moves forward to push the flip-up stopper 46 forward. In response to this, the flip-up stopper 46 swings against the biasing force of the stopper spring 46g to disengage the latching part 46a and the pin 23 from each other. After the latching part 46a and the pin 23 are disengaged from each other, the first frame 20 is flipped up to the upper position shown in FIG. 13(b) by the biasing force of the flip-up damper 45b.

When the flip-up control member 47 is controlled from the second position to the third position, the guide pin 42b slides inside the arc-like guide 49a to prevent transmission of force to the gate lever 42 acting to move the second link member 49, thereby preventing movement of the gate lever 42.

In the above-described configuration, when the flip-up control member 47 is controlled from the first position to the second position, the gate lever 42 moves to the retreating position. When the flip-up control member 47 is controlled further from the second position to the third position, flip-up motion is made while the gate lever 42 is maintained as it is. In this way, controlling the flip-up control member 47 in one direction makes it possible to make the retreating motion of the gate lever 42 and the flip-up motion of the first frame 20 continuously.

As shown in FIG. 13(b), the flip-up control member 47 is configured to be not controllable forward while the first frame 20 is flipped up to the upper position. Specifically, as shown in FIG. 13(b), while the first frame is flipped up to the upper position, the stopper pressing part 48d is engaged with the upper restricting part 46d and the tip hook 46e of the flip-up stopper 46. In this state, the first link member 48 is prevented from rotating in a direction in which the stopper pressing part 48d presses the tip hook 46e (a clockwise direction in FIG. 13(b)), so that the flip-up control member 47 cannot be controlled forward. In this way, the flip-up control member 47 is locked in an uncontrollable manner by the flip-up stopper 46. In this configuration, while the first frame 20 is in the flipped-up state, the flip-up control member 47 cannot be controlled forward to prohibit the gate lever 42 from moving to the blocking position.

As described above, the configuration of the present modification includes: the third frame 45 supporting the first frame 20 in such a manner as to be swingable upward and downward; the flip-up damper 45b that applies bias in such a manner as to flip up the first frame 20 to an upper position; the flip-up stopper 46 attached to the third frame 45 and engageable with the pin 23; and the flip-up control member 47 for controlling the flip-up stopper 46. The flip-up stopper 46 includes the latching part 46a with which the pin 23 is engageable and from which the pin 23 is disengageable. When the pin 23 is engaged with the latching part 46a, the first frame 20 is fixed to the lower position against the biasing force of the flip-up damper 45b. When the flip-up control member 47 is controlled to disengage the pin 23 from the latching part 46a, the first frame 20 is flipped up to the upper position by the biasing force of the flip-up damper 45b. In this configuration, the flip-up structure for the console 11 can be realized using the pin 23 forming the tilt structure.

In the present modification, the first frame 20 is pivotable relative to the third frame 45 while the tilt of the second frame 25 relative to the first frame 20 is held. In this configuration, a tilt position is maintained before and after getting on or off by an operator. This provides convenience as it eliminates a need to set a tilt position again on each occurrence of getting on or off by an operator.

In the configuration of the present modification, the gate lever 42 is provided rotatably to interfere with getting on and off the seat 10 by an operator, the gate lever 42 moves to the blocking position of blocking a pathway to the seat 10 when the flip-up control member 47 is controlled to the predetermined first position, and the gate lever 42 moves to the retreating position of retreating from the pathway to the seat 10 when the flip-up control member 47 is controlled to the predetermined second position. In this configuration, the flip-up control member 47 can be used not only for causing flip-up motion of the console 11 but also for controlling the gate lever 42, making it possible to simplify the configuration of the console 11.

In the configuration of the present modification, when the flip-up control member 47 is controlled from the first position to the second position, and then to the predetermined third position, the latching part 46a and the pin 23 are disengaged from each other. In this configuration, the retreat of the gate lever 42 and the flip-up motion of the console 11 can be made continuously only by controlling the flip-up control member 47 in one direction.

In the present modification, the flip-up control member 47 is locked in an uncontrollable manner by the flip-up stopper 46 so as to prohibit the gate lever 42 from moving to the blocking position while the first frame 20 is in a flipped-up state. This makes it possible to prevent the occurrence of moving the gate lever 42 erroneously to the blocking position with the first frame 20 in the flipped-up state, thereby enhancing safety.

| Reference Sings List | |
|---|---|
| 10 | Seat |
| 11 | Console |
| 12 | Operation lever |
| 20 | First frame |
| 20a | Side plate part |
| 21 | Swinging shaft |
| 22 | Damper |
| 23 | Pin |
| 25 | Second frame |
| 25a | Side plate part |
| 26 | Tilting shaft |
| 30 | Control member |
| 31 | Grip part |
| 32 | Guide part |
| 33 | Shaft hole |
| 34 | Groove |
| 35, 35A to 35F | Engagement part |
| 36 | Guideway |
| 37 | First section |
| 38 | Second section |
| 40 | Biasing member |
| 41 | Frame cover |
| 42 | Gate lever |
| 42a | Blocking part |
| 42b | Guide pin |
| 42c | Gate lever swinging shaft |
| 42d | Gate lever spring |
| 45 | Third frame |
| 45a | Flip-up swinging shaft |
| 45b | Flip-up damper |
| 46 | Flip-up stopper |
| 46a | Latching part |
| 46b | Lower restricting part |
| 46c | Arm part |
| 46d | Upper restricting part |
| 46e | Tip hook |
| 46f | Stopper swinging shaft |
| 46g | Stopper spring |
| 47 | Flip-up control member |
| 47a | Grasping part |
| 47b | Forward protrusion |
| 47c | First link connection |
| 47d | Pivotal shaft |
| 48 | First link member |
| 48a | First arm part |
| 48b | Second link connection |
| 48c | Second arm part |
| 48d | Stopper pressing part |
| 48e | Link swinging shaft |
| 49 | Second link member |
| 49a | Arc-like guide |

The invention claimed is:

1. A tilt structure to change the tilt of a console arranged at a lateral part of a seat, comprising:
a first frame arranged at the lateral part of the seat;
a second frame attached to an upper portion of the first frame in such a manner as to be swingable upward and downward; and
a control member attached to the second frame in such a manner as to be tiltable backward and forward through a tilting shaft, wherein
the first frame includes a protruding pin,
the control member includes a guide part with a groove in which the pin is accommodated,
the groove includes a plurality of engagement parts to be engaged with the pin,
a locked state and an unlocked state are switchable to each other by causing the control member to make tilting motion, the locked state being a state where the pin is engaged with any of a plurality of the engagement parts, the unlocked state being a state where the pin is disengaged from the engagement part, and the tilt of the second frame relative to the first frame is changed by engaging the pin with an arbitrary engagement part of a plurality of the engagement parts and changing a distance between the tilting shaft and the pin.

2. The tilt structure for a console according to claim 1, wherein
the guide part moves forward about the tilting shaft in response to backward pulling of the control member to disengage the pin provided at the first frame from the engagement part, thereby forming the unlocked state.

3. The tilt structure for a console according to claim 1, wherein
the groove includes a guideway provided on a side facing the engagement part of the groove and used for guiding the pin toward a direction of the engagement part.

4. The tilt structure for a console according to claim 1, wherein
the control member includes a grip part arranged above the tilting shaft for causing tilting motion of the control member, and the groove arranged below the tilting shaft.

5. The tilt structure for a console according to claim 1, wherein
the groove is composed of a first section with two or more of a plurality of the engagement parts arranged at a constant interval, and a second section provided under the first section and including one of a plurality of the engagement parts provided at a greater interval than the constant interval.

6. The tilt structure for a console according to claim 1, wherein
the control member is arranged on the front of the console.

7. A console with the tilt structure according to claim 1, the console comprising:
a third frame supporting the first frame in such a manner as to be swingable upward and downward;
a flip-up damper that applies bias in such a manner as to flip up the first frame to an upper position;
a flip-up stopper attached to the third frame and engageable with the pin; and
a flip-up control member for controlling the flip-up stopper, wherein
the flip-up stopper includes a latching part with which the pin is engageable and from which the pin is disengageable,
when the pin is engaged with the latching part, the first frame is fixed to a lower position against the biasing force of the flip-up damper, and
when the flip-up control member is controlled to disengage the pin from the latching part, the first frame is flipped up to an upper position by the biasing force of the flip-up damper.

8. The console according to claim 7, wherein
the first frame is pivotable relative to the third frame while the tilt of the second frame relative to the first frame is maintained.

9. The console according to claim 7, wherein
a gate lever is provided rotatably to interfere with getting on and off a seat by an operator, and
the gate lever moves to a blocking position of blocking a pathway to the seat when the flip-up control member is controlled to a predetermined first position, and the gate lever moves to a retreating position of retreating from the pathway to the seat when the flip-up control member is controlled to a predetermined second position.

10. The console according to claim 9, wherein
when the flip-up control member is controlled from the first position to the second position, and then to a predetermined third position, the latching part and the pin are disengaged from each other.

11. The console according to claim 10, wherein
the flip-up control member is locked in an uncontrollable manner by the flip-up stopper so as to prohibit the gate lever from moving to the blocking position while the first frame is in a flipped-up state.

12. The console according to claim 7, comprising:
an operation lever for steering of a machine, wherein
the flip-up control member is arranged backward of the operation lever.

* * * * *